United States Patent
Kuo

(10) Patent No.: US 9,261,657 B1
(45) Date of Patent: Feb. 16, 2016

(54) OPTICAL FIBER ARRAY CONNECTOR WITH RIBBON FIBER HOLDER

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/448,869

(22) Filed: Jul. 31, 2014

(51) Int. Cl.
*G02B 6/36* (2006.01)
*G02B 6/38* (2006.01)
*G02B 6/44* (2006.01)

(52) U.S. Cl.
CPC ............ *G02B 6/3885* (2013.01); *G02B 6/4403* (2013.01)

(58) Field of Classification Search
CPC ............................ G02B 6/3885; G02B 6/4403
USPC .................................................... 385/80, 114
See application file for complete search history.

(56) References Cited

U.S. PATENT DOCUMENTS 5,189,721 A * 2/1993 Sayegh et al. .................. 385/114
2006/0245694 A1* 11/2006 Chen et al. ....................... 385/71

* cited by examiner

*Primary Examiner* — Ryan Lepisto
(74) *Attorney, Agent, or Firm* — Novak Druce Connolly Bove + Quigg LLP

(57) ABSTRACT

An optical fiber array connector includes a ribbon fiber and a ribbon fiber holder. The ribbon fiber includes optical fibers having fixed pitch. The ribbon fiber holder includes a connection plate and a support member connected to the connection plate. The connection plate defines a ribbon shaped through hole. The support member includes a top surface and two rails. The two rails are supported by the top surface and parallel to each other. The two rails and the top surface cooperatively define a ribbon shaped receiving channel. The ribbon shaped receiving channel communicates with the ribbon shaped through hole. The ribbon fiber is received in the ribbon shaped receiving channel. The optical fibers are received in the ribbon shaped through hole.

9 Claims, 4 Drawing Sheets

OPTICAL FIBER ARRAY CONNECTOR WITH RIBBON FIBER HOLDER

FIELD

The subject matter herein generally relates to fiber optic communication technologies, and particularly to an optical fiber array connector with a ribbon fiber holder.

BACKGROUND

In the field of fiber optic communication, MT ferrules are common components. They often have 2, 4, 8, and 12 channels for holding optical fibers. In the manufacturing of the MT ferrules, grinding and polishing are necessary processes. However, the grinding and polishing processes are time-consuming and have low manufacturing efficiency. Thus, the MT ferrules are expensive. Optical fiber jumpers can be substituted for MT ferules and have low prices.

BRIEF DESCRIPTION OF THE DRAWINGS

Implementations of the present technology will now be described, by way of example only, with reference to the attached figures, wherein.

DETAILED DESCRIPTION

Figure 1:
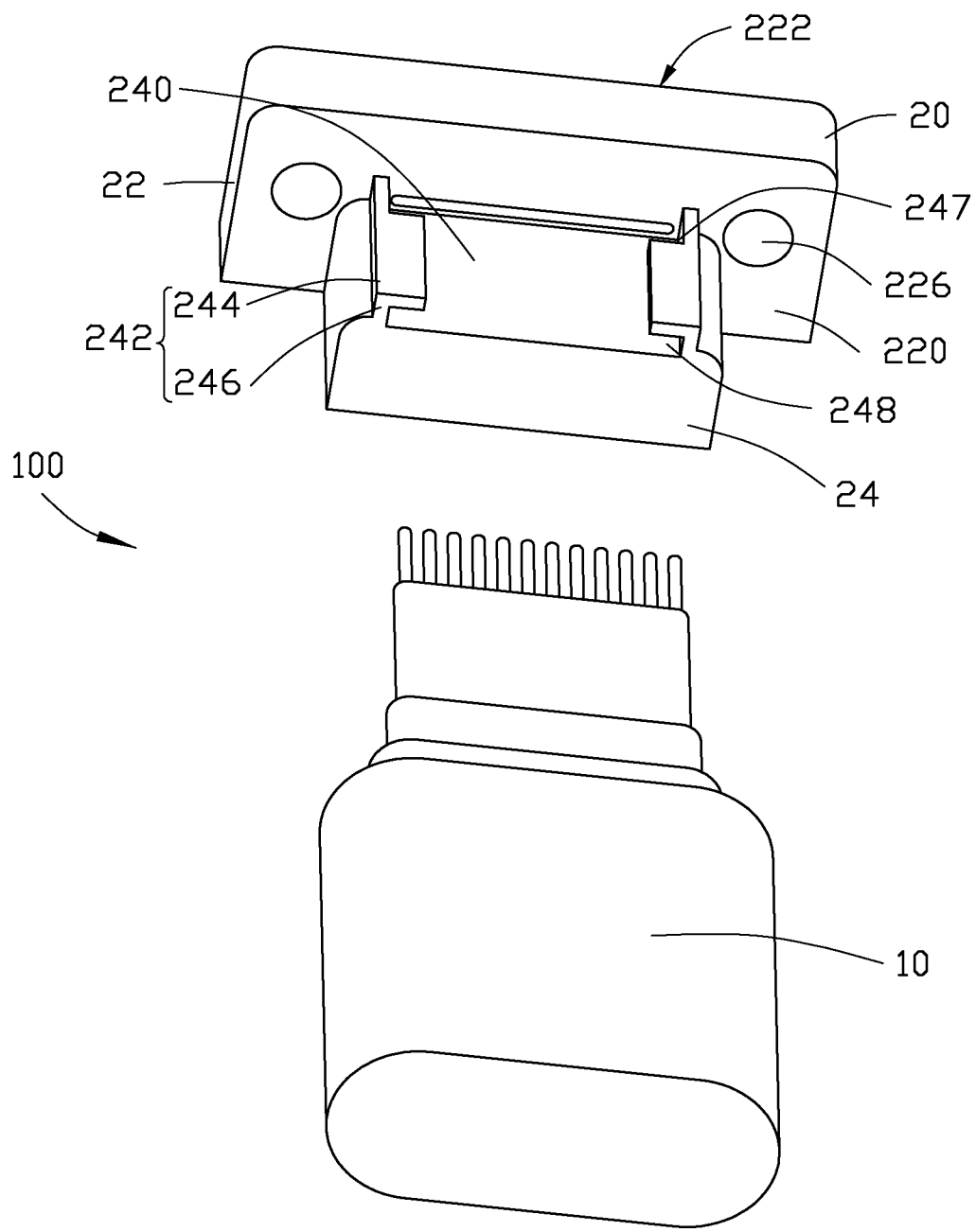
FIG. 1 is an exploded isometric view of an embodiment of an optical fiber array connector with a ribbon fiber holder.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Referring to FIG. 1, an embodiment of an optical fiber array connector 100 is shown. The optical fiber array connector 100 includes a ribbon fiber 10 and a ribbon fiber holder 20.

Figure 2:
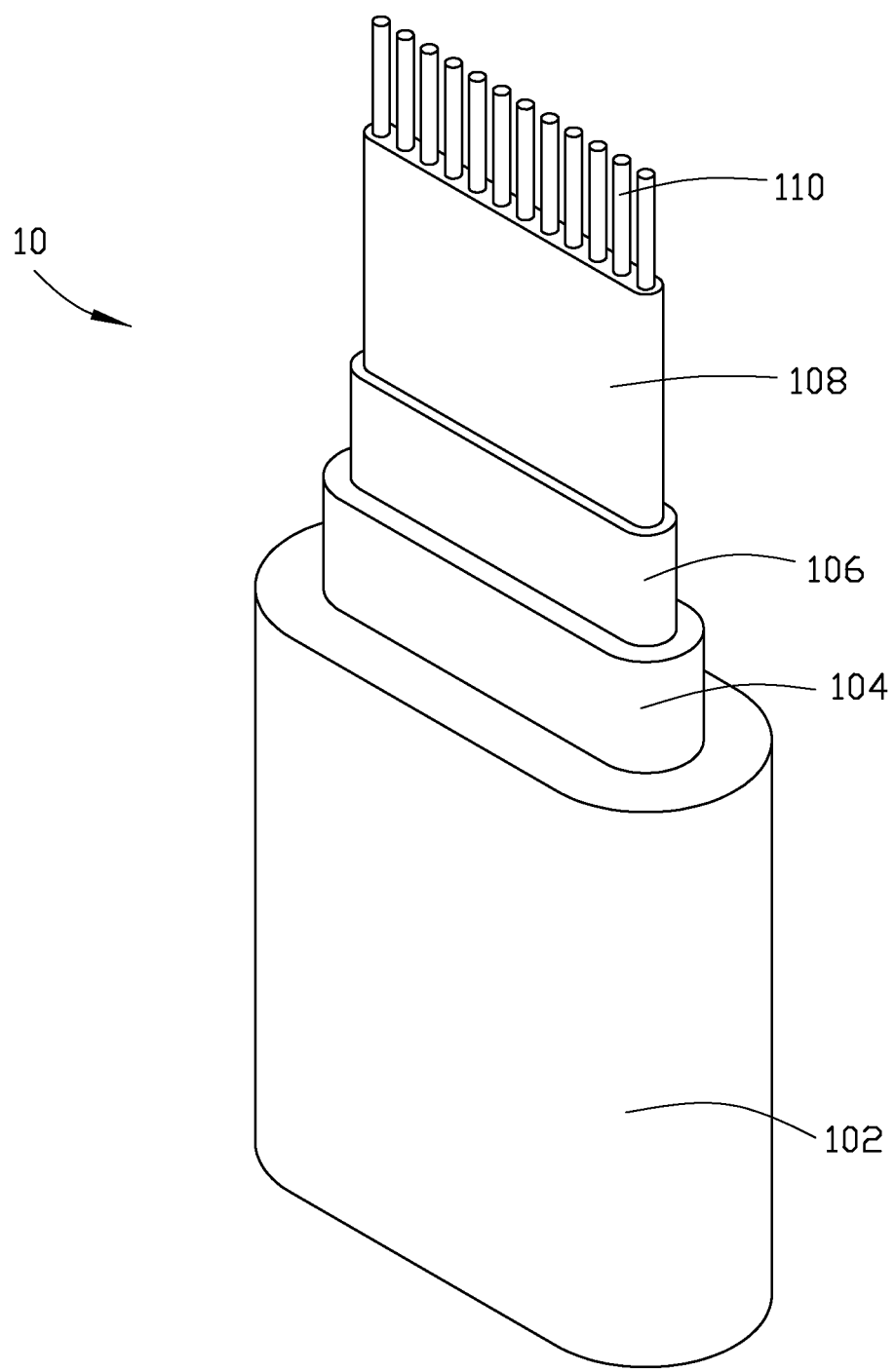
FIG. 2 is an isometric view of a ribbon fiber of the optical fiber array connector.

Referring also to FIG. 2, the ribbon fiber 10 includes a jacket 102, a strengthening member 104, a binder 106, a buffer 108, and a plurality of optical fibers 110. The optical fibers 110 are arranged in an array of rows and columns and have fixed pitch. The buffer 108 surrounds the optical fibers 110 and is configured to provide a buffer for protecting the optical fibers 110. The binder 106 bonds the buffer 108 to the strengthening member 104. The jacket 102 receives all of the strengthening member 104, the binder 106, the buffer 108 and the optical fibers 110 therein. In the illustrated embodiment, the optical fibers 110 are arranged in one row and have a fixed pitch.

Figure 3:
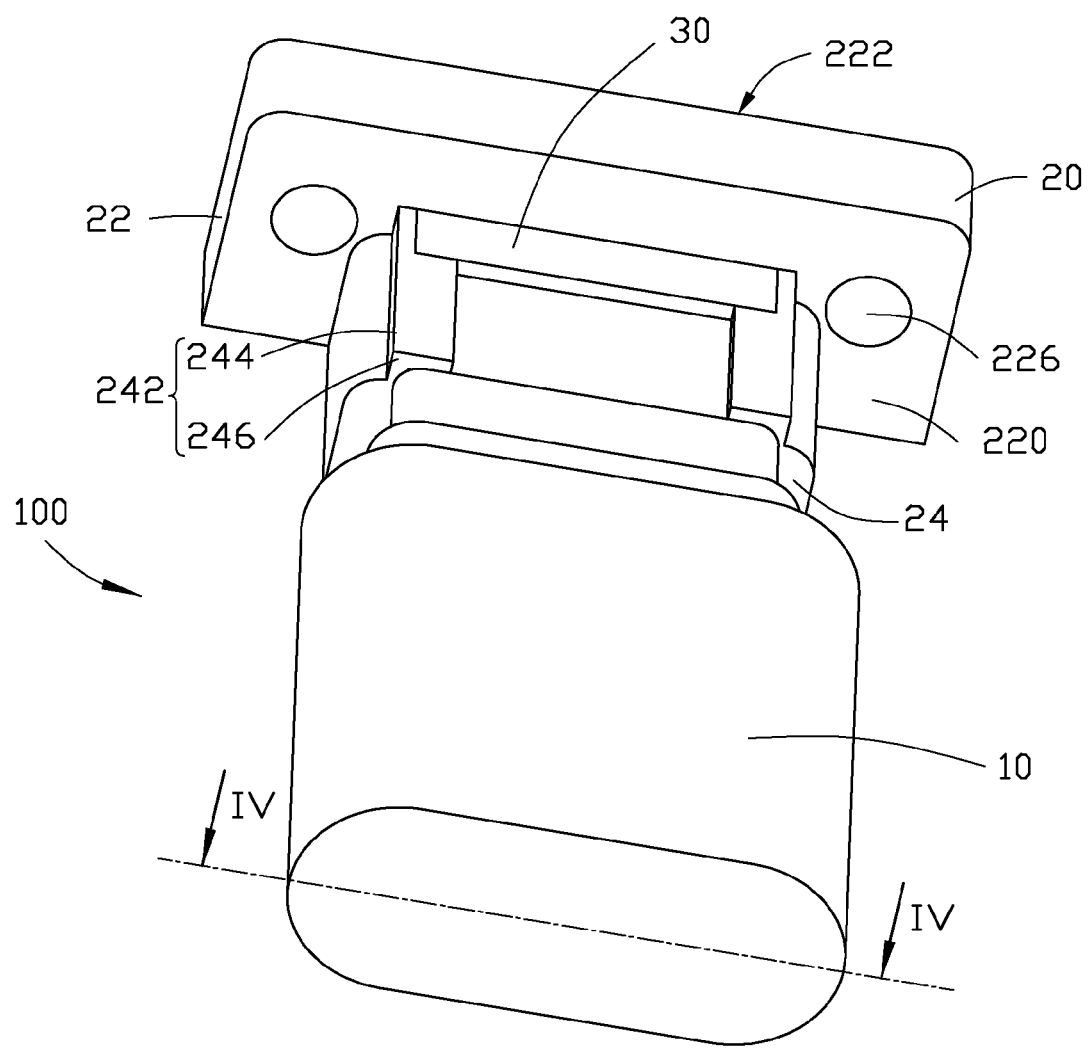
FIG. 3 is an assembled isometric view of the optical fiber array connector of FIG. 1.
Figure 4:
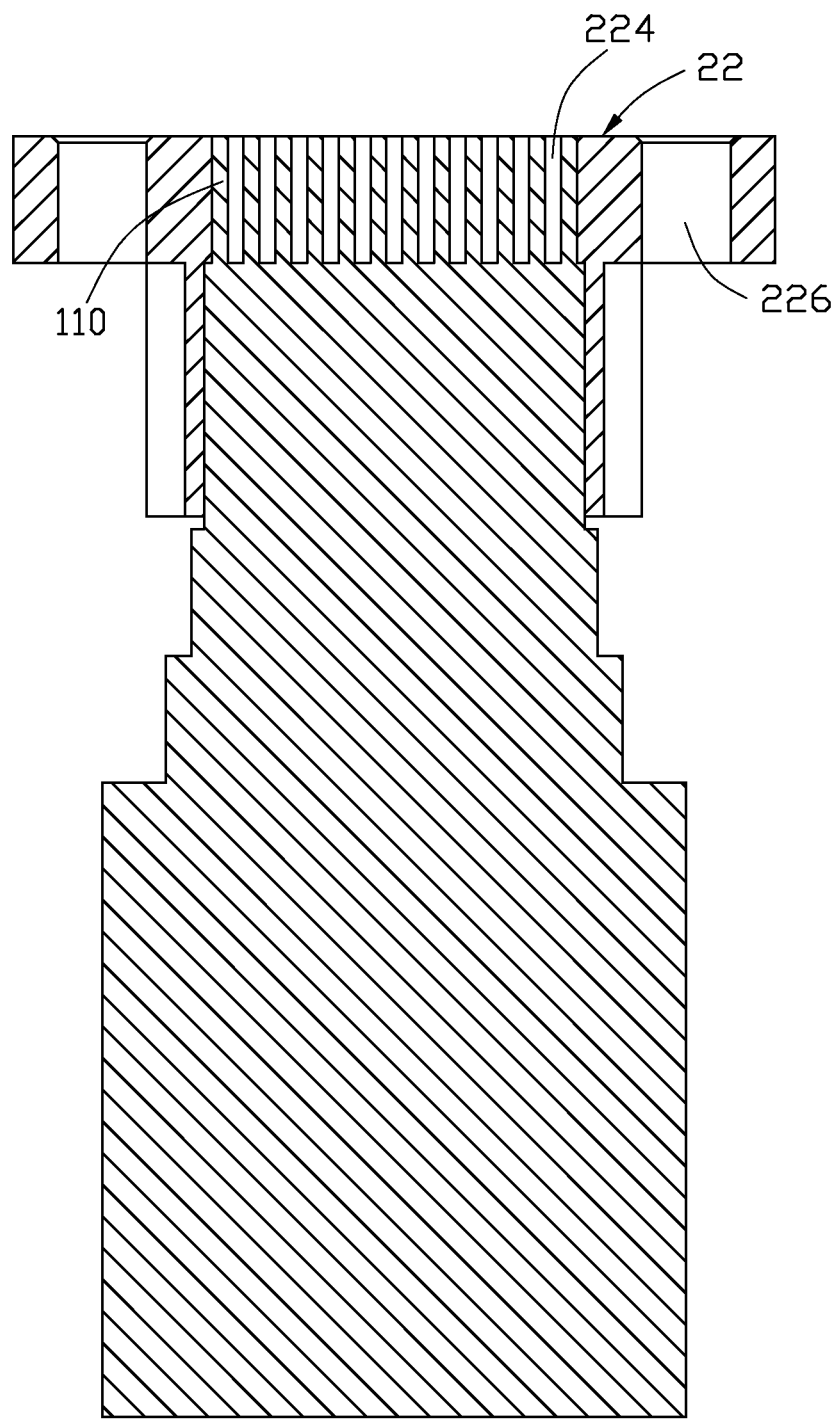
FIG. 4 is a cross-sectional view of the optical fiber array connector, taken along line IV-IV.

Referring to FIGS. 1, 3, and 4, the ribbon fiber holder 20 includes a connection plate 22 and a support member 24 connected to the connection plate 22.

The connection plate 22 is substantially cuboid shaped and includes a first surface 220 and a second surface 222 facing away from the first surface 220. The connection plate 22 defines a ribbon shaped through hole 224 running through the first and second surfaces 220, 222. The connection plate 22 also defines two positioning holes 226 at two sides of the ribbon shaped through hole 224. The two positioning holes 226 run through the first and second surfaces 220, 222.

The support member 24 is substantially cuboid shaped and connected to the first surface 220. The support member 24 includes a top surface 240 and two rails 242. Each rail 242 is substantially "L" shaped. Each rail 242 includes a support portion 244 and an extension portion 246 perpendicularly coupled to the support portion 244. Two support portions 244 of the two rails 242 are supported by the top surface 240 and parallel to each other. Extension portions 246 of the two rails 242 extend towards each other. Each rail 242 defines a cutout 247 in the extension portion 246 close to the first surface 220. The two rails 242 and the top surface 240 cooperatively define a ribbon shaped receiving channel 248. The ribbon shaped receiving channel 248 coupled with two cutouts 247 of the two rails 242 and the ribbon shaped through hole 224.

In assembly, a portion of the binder 106 is exposed and a portion of each of the optical fibers 110 is exposed, the exposed portion of the binder 106 is received and fixed in the ribbon shaped receiving channel 248. The exposed portions of the optical fibers 110 are received in the ribbon shaped through hole 224 and exposed from the second surface 222 through the ribbon shaped through hole 224. Glue 30 is applied in the cutouts 247 to bond the exposed portion of the binder 106 to the rails 242 and the top surface 240.

For example in use, two optical fiber array connectors 100 are coupled to each other. The second surfaces 222 of the two optical fiber array connectors 100 can touch one another. The optical fibers 110 of one optical fiber array connector 100 can be easily aligned with the optical fibers 110 of another optical fiber array connector 100, because the optical fibers 110 have fixed pitch.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical fiber array connector comprising:
   a ribbon fiber comprising a plurality of optical fibers having fixed pitch arranged in an array of rows and columns; and
   a ribbon fiber holder comprising a connection plate and a support member, the connection plate comprising a first surface and a second surface facing away from the first surface, the support member connected to the first surface, the connection plate defining a ribbon shaped through hole running through the first surface and the second surface, the support member comprising a top surface and two rails, the two rails supported by the top surface and parallel to each other, the two rails and the top surface cooperatively defining a ribbon shaped receiving channel, the ribbon shaped receiving channel communicating with the ribbon shaped through hole, the ribbon fiber received in the ribbon shaped receiving channel, the optical fibers received in the ribbon shaped through hole and exposed from the second surface through the ribbon shaped through hole;
   wherein each rail is substantially "L" shaped, each rail comprises a support portion and an extension portion perpendicularly connected to the support portion, two support portions of the two rails are supported by the top surface and parallel to each other, and extension portions of the two rails extend towards each other.

2. The optical fiber array connector of claim 1, wherein each rail defines a cutout in the extension portion close to the first surface, the ribbon shaped receiving channel communicates with two cutouts of the two rails, and glue is received in the cutouts to bond the ribbon fiber to the rails and the top surface.

3. The optical fiber array connector of claim 2, wherein the ribbon fiber comprises a jacket, a strengthening member, a binder, a buffer, and the optical fibers, the buffer surrounds the optical fibers and is configured to provide a buffer for protecting the optical fibers, the binder bonds the buffer to the strengthening member, and the jacket receives all of the strengthening member, the binder, the buffer and the optical fibers therein.

4. The optical fiber array connector of claim 3, wherein the optical fibers are arranged in one row and have fixed pitch.

5. The optical fiber array connector of claim 3, wherein a portion of the binder is exposed, the exposed portion of the binder is received and fixed in the ribbon shaped receiving channel, and the glue is received in the cutouts to bond the exposed portion of the binder to the rails and the top surface.

6. A ribbon fiber holder, comprising:
   a connection plate, the connection plate comprising a first surface and a second surface facing away from the first surface, the connection plate defining a ribbon shaped through hole running through the first surface and the second surface, and
   a support member, the support member connected to the first surface, the support member comprising a top surface and two rails, the two rails supported by the top surface and parallel to each other, the two rails and the top surface cooperatively defining a ribbon shaped receiving channel, the ribbon shaped receiving channel communicating with the ribbon shaped through hole, the ribbon shaped receiving channel configured to receive a ribbon fiber, the ribbon shaped through hole configured to receive optical fibers of the ribbon fiber and allow the optical fibers to be exposed from the second surface through itself;
   wherein each rail is substantially "L" shaped, each rail comprises a support portion and an extension portion perpendicularly connected to the support portion, two support portions of the two rails are supported by the top surface and parallel to each other, and extension portions of the two rails extend towards each other.

7. The ribbon fiber holder of claim 6, wherein each rail defines a cutout in the extension portion close to the first surface, the ribbon shaped receiving channel communicates with two cutouts of the two rails, and the cutouts are configured to receive glue to bond the ribbon fiber to the rails and the top surface.

8. The ribbon fiber holder of claim 6, wherein the connection plate defines two positioning holes at two sides of the ribbon shaped through hole.

9. The ribbon fiber holder of claim 8, wherein the two positioning holes run through the first and second surfaces.

* * * * *